US009332157B2

(12) United States Patent
Yamada

(10) Patent No.: US 9,332,157 B2
(45) Date of Patent: May 3, 2016

(54) PRINT CONTROL APPARATUS AND PRINT CONTROL PROGRAM FOR PRINTING WITH SPECIAL COLOR INK

(71) Applicant: SEIKO EPSON CORPORATION, Tokyo (JP)

(72) Inventor: Kazumi Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/189,581

(22) Filed: Feb. 25, 2014

(65) Prior Publication Data

US 2014/0293301 A1    Oct. 2, 2014

(30) Foreign Application Priority Data

Mar. 26, 2013    (JP) .................................. 2013-063552

(51) Int. Cl.
*H04N 1/54* (2006.01)
*G06F 3/12* (2006.01)
*G06K 15/02* (2006.01)

(52) U.S. Cl.
CPC ................ *H04N 1/54* (2013.01); *G06F 3/1213* (2013.01); *G06F 3/1245* (2013.01); *G06F 3/1285* (2013.01); *G06K 15/181* (2013.01); *G06K 15/022* (2013.01); *G06K 15/1802* (2013.01); *G06K 15/1832* (2013.01)

(58) Field of Classification Search
None
See application file for complete search history.

(56) References Cited

U.S. PATENT DOCUMENTS

| 6,317,217 | B1 * | 11/2001 | Toda | ...................... G06K 15/00 358/1.1 |
| 2005/0052693 | A1 * | 3/2005 | Kadota | ................. G06F 3/1214 358/1.15 |
| 2006/0215910 | A1 * | 9/2006 | Megawa | ........................ 382/176 |
| 2010/0027040 | A1 * | 2/2010 | Kuroda | ........................... 358/1.9 |
| 2010/0290096 | A1 | 11/2010 | Yamaguchi | |
| 2011/0234662 | A1 | 9/2011 | Tsuchiya | |
| 2011/0255103 | A1 * | 10/2011 | Matsuda | ........................ 358/1.9 |
| 2012/0062956 | A1 * | 3/2012 | Kitagawa et al. | ............. 358/2.1 |
| 2012/0269525 | A1 | 10/2012 | Shindo | |

FOREIGN PATENT DOCUMENTS

| JP | 2009-017338 A | 1/2009 |
| JP | 2012-058977 A | 3/2012 |
| JP | 2012-153151 A | 8/2012 |
| JP | 2012-226549 A | 11/2012 |

OTHER PUBLICATIONS

The Extended European Search Report for the corresponding European Application No. 14157096.0 dated May 28, 2015.

* cited by examiner

*Primary Examiner* — Barbara Reinier
(74) *Attorney, Agent, or Firm* — Global IP Counselors, LLP

(57) ABSTRACT

A print control apparatus includes an image data acquisition unit for acquiring at least first image data of a raster format that defines color information and second image data of a raster format that defines an amount of recording with a special color ink different from the color that is indicated by the color information, a PDL data generation unit for generating PDL data with which an instruction for printing a document comprising at least an image represented by the first image data and the second image data is described by a page description language, and a transfer unit for transferring the generated PDL data to a print unit, wherein the PDL data generation unit generating a command for designating a method of printing for the special color ink represented by the second image data and generating PDL data that includes the generated command.

10 Claims, 5 Drawing Sheets

DESIGNATED IMAGE

PRINT CONTROL APPARATUS AND PRINT CONTROL PROGRAM FOR PRINTING WITH SPECIAL COLOR INK

CROSS-REFERENCE TO RELATED APPLICATIONS

This application claims priority to Japanese Patent Application No. 2013-063552 filed on Mar. 26, 2013. The entire disclosure of Japanese Patent Application No. 2013-063552 is hereby incorporated herein by reference.

BACKGROUND

1. Technical Field

The present invention relates to a print control apparatus and a print control program.

2. Background Technology

There is a need for what is called high-speed printing, in which more printing is executed by a printer in less time. Included as one of the important elements for achieving high-speed printing is a reduction in the time required for transferring the necessary information to the printer (the transfer time). Also, in printers, a special color ink can be used for printing in some instances. Special color inks include inks of spot colors (for example, metallic ink) that do not fall under the process colors (cyan, magenta, yellow, and black), and liquids for creating a special visual effect (for example, clear inks). Herein, regarding objects that are illustrated with the same color as an instruction color for specifying a region where printing is to be carried out, using a special color recording material, there is known a print control apparatus that includes an issuing means for issuing a draw command for printing using the special color recording material, and a transmitting means for transmitting PDL data, which includes this draw command, to a print apparatus (see Patent Document 1).

Japanese Laid-open Patent Publication No. 2012-58977 (Patent Document 1) is an example of the related art.

SUMMARY

To reduce the above-mentioned transfer time, reducing the amount of information that is transferred could be considered. Included as one technique for reducing the amount of information is converting image data that represents an image to be printed by the printer into a command that the printer is able to interpret. However, such a conversion into a command does not necessarily lead to a reduction in the amount of information at all times. For example, even in a case of conversion into a command as per the above-mentioned document, it would be possible in some instances for the amount of information that must be transferred to instead be even greater than there was before the conversion into a command, or for the print time to become longer as time is required for the actual processing of the conversion into a command.

The invention has been made in order to solve at least the problem described above, and provides a print control apparatus and print control program able to contribute to shortening the above-mentioned transfer time by appropriately reducing the amount of information being transferred, and achieve printing of an unprecedented high speed.

In one aspect of the invention, a print control apparatus is provided with an image data acquisition unit for acquiring at least first image data of a raster format that defines color information and second image data of a raster format that defines an amount of recording with a special color ink different from the color that is indicated by the color information; a PDL data generation unit for generating PDL data with which an instruction for printing a document including at least an image represented by the first image data and the second image data is described by a page description language; and a transfer unit for transferring the generated PDL data to a print unit; the configuration being such that the PDL data generation unit determines whether or not to convert the second image data into a command in accordance with the content of the second image data and, in a case where a determination is made to convert into a command, generates a command for designating a method of printing for the special color ink represented by the second image data and generates PDL data that includes the generated command. The special color ink applies as a white ink, a clear ink, a metallic ink, and/or a pre-coat solution.

According to the configuration of the invention, the determination of whether or not to convert the second image data, which is represented by a collection of pixels for which the amount of recording with the special ink is respectively defined, into a command is made in accordance with the content thereof, and the conversion into a command is carried out only in a case where a determination is made to convert into a command. This determination is made in terms of whether or not the content of the second image data is such that the amount of information could be reduced by the conversion into a command. As such, the conversion into a command reliably reduces the amount of information for causing the special color ink to be printed, and transferring the PDL data that includes this command to the print unit reduces the time that is needed to transfer the PDL data. As a result, printing of an unprecedented high speed is realized.

There are a variety of determination criteria used by the PDL data generation unit. For example, the PDL data generation unit can make the determination in accordance with the uniformity of the amounts of recording with the special color ink for each of the pixels of the second image data. Alternatively, the PDL data generation can make the determination in accordance with the shape that is represented by the special color ink in the second image data, or can make the determination in accordance with the size of the range where the special color ink is recorded in the second image data, or can make the determination in accordance with the number of ranges where the special color ink is recorded in the second image data. Making the determination on the basis of any one of or a combination of the plurality of determination criteria of such description makes it possible to accurately determine whether or not the conversion into a command makes it possible to reduce the amount of information in the second image data.

In one aspect of the invention, the PDL data generation unit can generate the PDL data, which includes the first image data. That is to say, PDL data in which the first image data is included (inserted, affixed, embedded) without alteration is generated. Alternatively, the PDL data generation unit can generate the PDL data, which includes the first image data, which has been compressed by a predetermined method of compression. According to this configuration, reducing the amount of information in the first image data by compression and then causing same to be included in the PDL data reduces the time needed for the transfer unit to transfer the PDL data. In one aspect of the invention, the PDL data generation unit can generate the PDL data, which includes the second image data, which has been compressed by a predetermined method of compression, in a case where a determination is made not to convert the second image data into a command. According to this configuration, reducing the amount of information by compression even in a case where the second image data is not converted into a command reduces the time needed for the transfer unit to transfer the PDL data.

The technical concept as in the invention need not be realized only in the form of a print control apparatus, but rather can be embodied by other forms. It would also be possible to comprehend the invention of a method (a print control method) including steps corresponding to the features of the print control apparatus in any of the aspects described above, the invention of a print control program for causing a predetermined hardware (a computer) to execute the method, or the invention of a computer-readable recording medium in which the program is recorded. The print control apparatus can be realized by a single apparatus or can be realized by the combination of a plurality of apparatuses.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
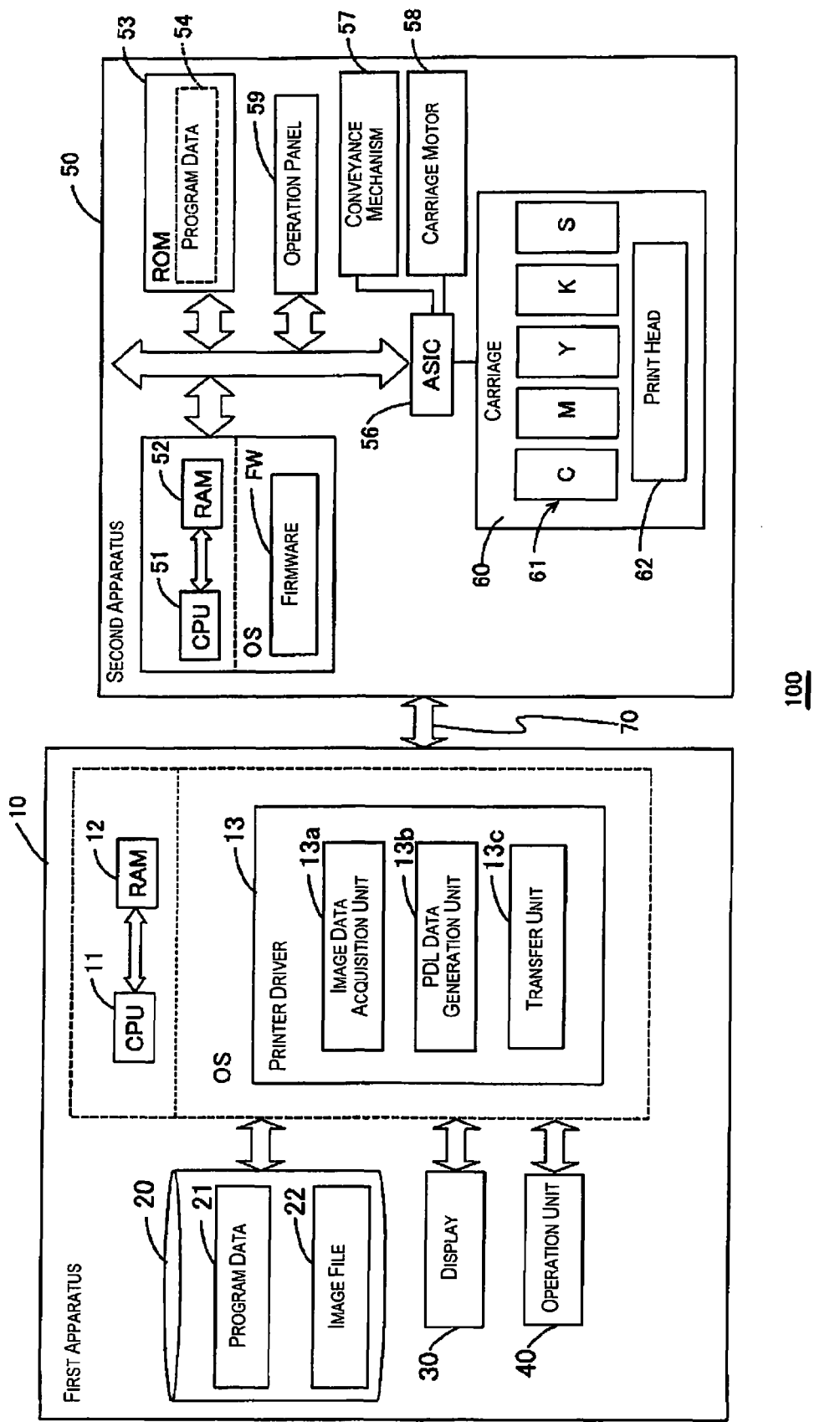
FIG. 1 is a drawing schematically illustrating a hardware configuration and a software configuration.

The following is a description of an embodiment of the invention, with reference to the accompanying drawings.
1. Overview of the Apparatuses FIG. 1 schematically illustrates a hardware configuration and a software configuration as in the present embodiment. In FIG. 1, a first apparatus 10 and a second apparatus 50 are illustrated. The first apparatus 10 has a function for controlling the second apparatus 50 and causing the second apparatus 50 to execute printing; for example, a personal computer (PC), server, mobile terminal apparatus, and the like would apply. The second apparatus 50 is a printer. A "printer" refers (JIS X0012-1990) to an output apparatus for making a hard copy recording of data, a principal form of which is discrete columns of graphic characters belonging to one or a plurality of previously established character sets. In many instances, a printer can also be used as a plotter. A "plotter" refers (JIS X0012-1990) to an output apparatus for directly producing a hard copy recording of data in the form of two-dimensional graphics on a removable medium. Provided that the second apparatus 50 can function as a printer, the second apparatus 50 can also be a so-called multifunction peripheral that functions also as a scanner and a copier.

The first apparatus 10 applies as one example of a print control apparatus. Alternatively, a system 100 including the first apparatus 10 and the second apparatus 50 may be understood to be the print control apparatus, or it would also be possible to understand only the second apparatus 50 to be a print control apparatus. The second apparatus 50, either in the entirety thereof or at least partially, applies as a print unit. Further, the first apparatus 10 and the second apparatus 50 are not to be presumed only to each respectively be an individual apparatus. The first apparatus 10 and the second apparatus 50 may be understood to apply as each of the parts in a single, integrally configured product, and the present embodiment also encompasses a configuration in which a part of this product functions as the first apparatus 10 and another part functions as the second apparatus 50.

In the first apparatus 10, a printer driver 13 for controlling the second apparatus 50 is executed by a CPU 11 deploying program data 21 that is stored in a hard disk drive (HDD) 20 or the like to a RAM 12 and carrying out operations in accordance with the program data 21 under an operating system (OS). The printer driver 13 is a program for causing the CPU 11 to execute respective functions of an image data acquisition unit 13a, a PDL data generation unit 13b, a transfer unit 13c, and the like. Each of these functions shall be described in greater detail below.

Connected to the first apparatus 10 is a display 30 serving as a display unit; the display 30 displays a user interface (UI) screen needed for processing. The first apparatus 10 is provided as appropriate with an operation unit 40 achieved by, for example, a keyboard, mouse, or a variety of buttons, a touch pad, a touch panel, or the like, and instructions that are needed for respective processes are inputted via the operation unit 40 by the user. The first apparatus 10 is connected so as to be able to communicate with the second apparatus 50 by a transfer path 70. The transfer path 70 is a general term for an either wired or wireless communication pathway. In a case where the first apparatus 10 and the second apparatus 50 are an integrated product, as described above, then the transfer path 70 is a communication pathway within this product. As will be described below, in the first apparatus 10, PDL data is generated by the function of the printer driver 13, and the PDL data is transmitted to the second apparatus 50 via the transfer path 70.

In the second apparatus 50, firmware FW for controlling is executed by a CPU 51 deploying program data 54 that is stored in a ROM 53 or the like to a RAM 52 and carrying out operations in accordance with the program data 54 under an OS. The firmware FW performs as appropriate such executions as interpreting a command or decompressing compressed data to generate print data, on the basis of the PDL that is transmitted from the first apparatus 10. Then, sending the print data to an application-specific integrated circuit (ASIC) 56 makes it possible to cause printing that is based on the print data to be executed.

The ASIC 56 acquires the print data and generates a drive signal for driving, for example, a conveyance mechanism 57, a carriage motor 58, or a print head 62 on the basis of the print data. The print head 62 applies as a permanent head, and refers to (JIS Z8123-1: 2013) a mechanical part or electrical part of a main printer body that continuously or intermittently generates liquid droplets of ink. The second apparatus 50 is provided with, for example, a carriage 60, and the carriage 60 is loaded with a cartridge 61 for each of a plurality of types of ink. The example in FIG. 1 is loaded with cartridges 61 corresponding to a variety of liquids: cyan (C), magenta (M), yellow (Y), black (Y), and special color (S) ink. The S ink is, for example, a white ink. Alternatively, the S ink may be a clear ink, a metallic ink, or a pre-coat solution.

The "white ink", as suggested by the name, signifies an ink that is either white in color or is of a color that is generally handled as being the same color as white. The white ink is ejected as, for example, a base for when the other inks are ejected, onto a translucent print medium. A "clear ink" refers to a translucent ink that has such effects as causing the print result from other inks to manifest glossiness, or reducing any unevenness in the surface of this print result. A "metallic ink" refers to, for example, an ink that includes a metallic pigment, a d is an ink that causes a metallic glossiness or metallic quality to be manifested in the print result. A pre-coat solution refers to a liquid that has such functions as improving coloring performance or preventing bleeding of other inks that have impacted onto the print medium, by being ejected thereon in advance of the other inks (see Japanese laid-open patent publication 2012-153151, etc.). The specific types or number of inks used by the second apparatus 50 are not limited to what is described above; for example, it would be possible to use a variety of inks, such as light cyan, light magenta, orange, green, gray, light gray, and so forth. The cartridges 61 also need not be loaded into the carriage 60, but may rather be installed at a predetermined position in the second apparatus 50.

The carriage 60 is provided with the print head 62, which sprays (ejects) from a plurality of ink ejection holes (hereinafter, "nozzles") the inks that are supplied from each of the cartridges 61. As such, the second apparatus 50 applies as an inkjet printer. An inkjet printer refers (JIS X0012-1990) to a non-impact printing apparatus wherein characters are formed by particles or small droplets of ink on paper. Provided in the print head 62 are piezoelectric elements for causing the ink droplets (dots) to be sprayed from the nozzles, the piezoelectric elements respectively corresponding to the nozzles. The piezoelectric elements are deformed when the above-mentioned drive signal is applied, and cause the dots to be ejected from the corresponding nozzles. The conveyance mechanism 57 is provided with a paper-feeding motor and paper-feeding rollers (not shown), and conveys a print substrate along a feed direction by being subjected to a drive control by the ASIC 56. The "feed direction" refers to the orientation of a geometric vector involved in the movement of the print substrate when the print substrate and the head face each other.

The print substrate refers to a material that retains a printed image. The shape is generally rectangular, but may in some instances be circular (for example, optical discs such as CD-ROMs and DVDs), triangular, quadrangular, polygonal, and so forth; at least all of the types of paper and paperboard products and processed products set forth in the Japanese Industrial Standard "JIS P0001:1998—Paper, board and pulp" are included. More specific examples include sheet-fed paper, roll paper, board paper, paper, non-woven fabric, cloth, ivory board, asphalt paper, art paper, colored board, colored wood free paper, inkjet printing paper, SENKA printing paper, printing paper, printing paper grade A, printing paper grade B, printing paper grade C, printing paper grade D, India paper, printing tissue paper, Japanese tissue paper, back carbon paper, air mail paper, sanitary paper, embossed paper, optical character recognition (OCR) paper, offset printing paper, cardboard, chemical fiber paper, converting paper, Gasen-shi, pattern paper, machine glazed kraft paper, wall paper base, thread paper, pressure sensitive copying paper, light sensitive paper, thermal recording paper, Ganpi-shi, can board, straw board, imitation leather paper, ticket paper, high performance paper, cast coated paper, Kyohana-gami, Japanese vellum, metallized paper, metal foil paper, glassine, rotogravure paper, kraft paper, extensible kraft paper, kraft board, crepe paper, lightweight coat paper, cable insulating paper, saturating decorative paper, building material base, Kent paper, abrasive paper base, synthetic paper, synthetic fiber paper, coat paper, capacitor tissue paper, miscellaneous paper, woody paper, bleached craft paper, diazo sensitized paper, core paper, magnetic recording paper, boxboard, dictionary paper, lightproof paper, heavy duty sack kraft paper, machine glazed paper, security paper, Shoji-gami, wood free paper, communication paper, food paper, book paper, Shodo-yoshi, white lined board, white lined chipboard, newsprint, blotting paper, water-soluble paper, drawing paper, ribbed kraft paper, laid paper, speaker cone paper, dielectric-coated paper, cellulose wadding, industrial laminate base, gypsum liner board, adhesive and release paper base, printing paper grade B—special, cement sack paper, ceramic paper, solid fiberboard, tar paper, tarpaulin paper, alkali-resistant paper, fire-resistant paper, acid-resistant paper, greaseproof paper, towel paper, Dan-shi, corrugated fiberboard, liner and corrugating medium, map paper, chip board, wood containing paper, alkaline paper, Chiri-gami, mat art paper, tea bag paper, soft tissue, electrical insulating paper, Tengujo, pasted paper, transfer paper, toilet tissue paper, paper for punched cards, stencil base paper, coated printing paper, coating base paper, Torinoko, tracing paper, fluting medium, napkin paper, flame resistant paper, paper for non-impact printing (NIP), tag paper, pressure-sensitive adhesive paper, carbonless copy paper, release paper, machine glazed brown wrapping paper, baryta paper, paraffin paper, waxed paper, vulcanized fiber, Han-shi, paper for indirect electrostatic process, writing paper, ultra lightweight coat paper, business form, continuous business form, manifold base paper, press board, moisture proof paper, Hosho-shi, waterproof paper, non-tarnish paper, wrapping paper, bond paper, manila board, Mino-gami, Shoin-gami, milk carton board, simile paper, oiled paper, Yoshino-gami, rice paper, cigarette paper, linear board, liner, vegetable parchment, kraft paper, roofing paper, filter paper, Japanese Washi paper, varnished paper, wrapper, lightweight paper, air-dried paper, wet strength paper, ashless paper, acid free paper, paper or board without finish, two-layer paper or board, three-layer paper or board, multi-layer paper or board, unsized paper, sized paper, wove paper, veined paper or board, machine-finished paper or board, machine-glazed paper or board, plate-glazed paper or board, friction-glazed paper or board, calendared paper or board, super calendared paper, lamine (paper or board), one-sided colored paper or board, two-sided colored paper or board, twin wire paper or board, rag paper, all-rag paper, mechanical wood pulp or board, mixed straw paper or board, water-finished paper or board, chipboard, lined chipboard, millboard, glazed millboard, solid board, mechanical pulp board, brown mechanical pulp board, brown mixed pulp board, leatherfiber board, asbestos board, felt board, tarred brown paper, waterleaf paper, surface sized paper, presspahn, press paper, cockle finished paper, pasted ivory board, blade coated paper, roll coated paper, gravure coated paper, size press coated paper, brush coated paper, air knife coated paper, extrusion coated paper, dip coated paper, curtain coated paper, hot melt coated paper, solvent coated paper, emulsion coated paper, bubble coated paper, imitation art paper, bible paper, poster paper, wrapping tissue, base paper, carbonizing base paper, base paper for diazotype, photographic base paper, base paper for the protection of frozen and deep-frozen foods (i.e. direct contact), base paper for the protection of frozen and deep-frozen foods (i.e. non-contact), safety paper, banknote paper, insulating paper or board, paper for laminated insulators, paper for conductor insulation, shoe board, paper for textile paper tubes, jacquard paper or board, board for pressing, bookbinding board, suitcase board, flong, archival paper, kraft line, test liner, kraft faced liner, couverture ordinaire, envelope paper, folding boxboard, coated folding boxboard, bleached lined folding boxboard, typewriting paper, stencil duplicator copy paper, spirit duplicator copy paper, calendar bowl paper, ammunition cartridge, fluting paper, fluted paper, union paper, reinforced union paper, cloth-lined paper or board, cloth centered paper or board, reinforced paper or reinforced board, pasted lined board, carton compact, facing, molded pulp products, wet crepe, index card, carbon paper, multi copy business form, carbonized forms, carbonless copy paper forms, correspondence envelope, post card, illustrated post card, letter card, illustrated letter card, and the like. In particular, high performance paper is not limited to plant fibers, and a wide range of materials are used, include inorganic, organic, and metal fiber; high performance paper encompasses paper that is given high performance in paper-making and treatment processes and is mainly used as materials for cutting-edge fields such as information, electronics, and medicine, but there is no limitation thereto.

The controlling of the drive of the carriage motor 58 by the ASIC 56 causes the carriage 60 (and the print head 62) to move along a direction (a scanning axis direction) that intersects with the feeding direction, and the ASIC 56 causes the print head 62 to eject the ink from each of the nozzles in association with this movement. This causes the dots to adhere to the print substrate, and causes an image that is based on the print data to be reproduced on the print substrate. The term "intersects" mentioned above signifies orthogonality here. However, the term "orthogonal" referred to in the present specification does not signify only a rigid angle of 90°, but rather has a significance that encompasses an error of angle of an extent that is acceptable for the quality of the product.

The second apparatus 50 is further provided with an operation panel 59. The operation panel 59 includes a display unit (for example, a liquid crystal panel), a touch panel that is formed within the display unit, and a variety of buttons or keys, and accepts an input coming from a user, displays a required UI screen on the display unit, and so forth. The second apparatus 50 is not limited to being a serial printer in which the print head 62 moves along the scanning axis direction, as is described above. A "serial printer" refers (JIS X0012-1990) to a printing apparatus that prints one character at a time. For example, the second apparatus 50 may be a head for a line printer, in which a plurality of columns of nozzles for each type of ink are arranged side by side in the feeding direction, nozzles being arranged side by side along the scanning axis direction in the columns. A "line printer" refers (JIS X0012-1990) to a printing apparatus that prints a row of characters as a unit. The means for ejecting the dots from the nozzles is also not limited to the piezoelectric elements described above, but rather a means for heating the ink using a heating element and causing the dots to be ejected from the nozzles may also be employed. Further, the format of printing employed by the printer (the second apparatus 50) need not be limited to being the inkjet format described above, but may rather be a laser format or thermal format.

2. Print Control Process

Figure 2:
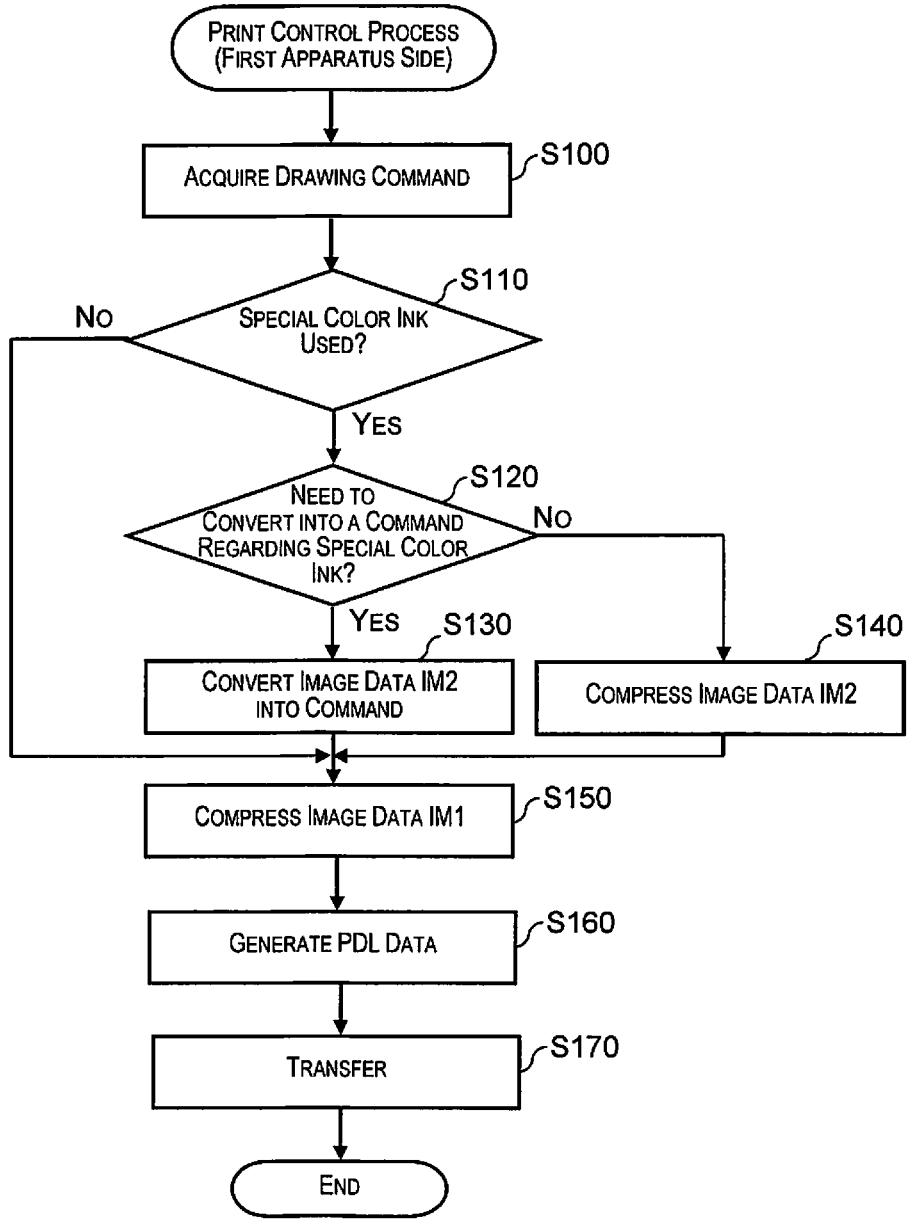
FIG. 2 is a flow chart illustrating a process that is executed on a first apparatus side.

In FIG. 2, a flow chart illustrates print control process as in the present embodiment, wherein the process is executed on the first apparatus 10 side. Herein, the CPU 11 is described as executing this flow chart using the printer driver 13 (one type of print control program). A condition for the flow chart to be started up is a state where operating of the operation unit 40 by the user has caused desired application software to be booted up in the first apparatus 10, and an image to be printed by the second apparatus 50 has been selected as desired by the user.

Herein, an "image" refers to a photograph, painting, illustration, graphic, text, or the like that is visible to human eyes, and is for appropriately representing the shapes, colors, and perspective of an original. "Image data" signifies digital data for representing an image. Vector data, bitmapped images, and the like are included as applying as image data. "Vector data" refers to image data that is stored as a set of instructions and parameters for representing geometric shapes such as straight lines, circles, and arcs. A "bitmapped image" refers to image data that is described by an array of pixels. Bitmapped images can also be a term for image data that is in a raster format. "Pixels" are the smallest element constituting an image to which a color and brightness can be independently assigned. "Half-tone" refers to an image constituted of points of different densities or shapes, sizes, or screen ruling. A half tone is generated by dithering, error diffusion, and the like. "Half-tone dots" refers to the individual elements that constitute the tone. Half-tone dots can have a variety of shapes, such as square, round, or elliptical.

Below, an image that has been selected as desired by the user is called a designated image. The user operates the operation unit 40 to cause a UI screen for print condition setting to be displayed on the display 30. In this state, the printer driver 13 receives, according to the user input, a print instruction of the designated image as well as the selection of the print conditions for causing the second apparatus 50 to print the designated image.

For example, the printer driver 13 can accept, in accordance with the user input, a variety of print conditions such as the selection of either color printing or monochromatic printing, a print mode (print speed), the type of print medium, the orientation of printing, an assignment regarding the paper surface, or whether or not double-sided printing is needed. The printer driver 13 could also receive an instruction for the method of printing of S ink (an instruction regarding the range, concentration, or the like for printing of the S ink), in accordance with the user input via the UI screen.

In step S100, the image data acquisition unit 13a acquires a drawing command from the application software. Transmission of the drawing command from the application software is triggered by the print instruction, and the drawing command includes an image file 22 that represents the designated image. The image file 22 is generated by the application software, and is acquired from a predetermined storage region, e.g., the HDD 20 or a memory apparatus that is mounted onto a connector for external connection (not shown).

Figure 3:
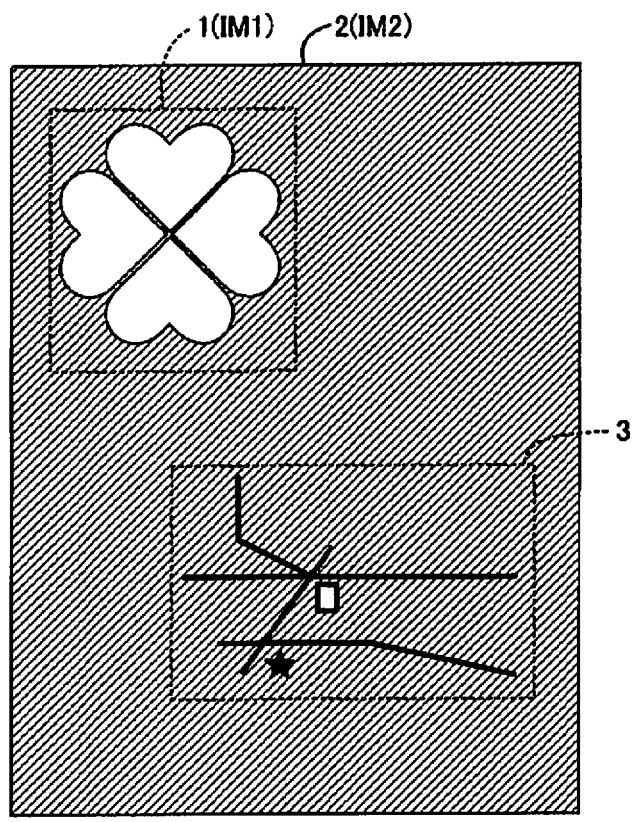
FIG. 3 is a drawing schematically illustrating one example of a designated image.

FIG. 3 is a drawing schematically illustrating one example of a designated image (a document) represented by the image file 22. The designated image includes, for example, a photographic image 1, an S ink image 2, and a graphic image 3. The photographic image 1 and the S ink image are represented by image data IM1 and image data IM2, respectively. The image data IM1 and IM2 are both image data of a raster format (also called a bitmapped format) represented by the collection of a plurality of pixels. Herein, the image data IM1 is image data in which the tone of a given subject (for example, a flower) is represented by color information (for example, red (R), green (G), or blue (B)) for every pixel. The image data IM2 is image data that defines the amount of recording with the S ink (a metallic ink, as one example) for every pixel; as one example, the same amount of recording with the S ink is defined for the entire region of the designated image. The image data IM1 applies as one example of the first image data in the claims, and the image data IM2 applies as one example of the second image data in the claims. As such, step S100 could also be said to be a step for acquiring first image data of a raster format representing color information for every pixel and second image data of a raster format that defines for every pixel an amount of recording with the S ink different from the color indicated by the color information.

The image data IM2 for representing the S ink image 2 may be information that is included in the image file 22 before the user selects the image file 22 as the designated image, or may be information that is generated in accordance with the input of when the user inputs the method of printing for the S ink via the UI screen. The graphic image 3 is computer graphics (CG), and is represented by a vector format. According to data of the vector format, lines or graphics in the designated image are defined by parameters such as information on coordinates, regions, colors, and filling.

In step S110, the PDL data generation unit 13*b* determines whether or not the S ink is used for the designated image; in a case where the S ink is used, then the flow proceeds to step S120, and in a case where the S ink is not used, then the flow proceeds to step S150. In the example in FIG. 3, the designated image includes the image data IM2 defining the amount of recording with the S ink for every pixel, and therefore the PDL data generation unit 13*b* determines "YES" in step S110 and the flow proceeds to step S120.

In step S120, the PDL data generation unit 13*b* determines whether or not to convert the image data IM2 into a command, in accordance with the content of the image data IM2 relating to the S ink. The PDL data generation unit 13*b* determines to convert into a command when it appears that converting the image data IM2 to a command makes it possible to reduce the amount of information that is needed in order to cause the second apparatus 50 to print the S ink. In turn, the PDL data generation unit 13*b* determines not to convert into a command when it appears that converting the image data IM2 to a command would either increase the amount of information that is needed in order to cause the second apparatus 50 to print the S ink, or would have substantially no effect in reducing the amount of information. The flow proceeds to step S130 in a case where a decision is made to convert to a command, and the flow proceeds to step S140 in a case where a decision is made not to convert to a command. Several criteria for the determination in this step S120 shall be illustrated below.

Criterion 1:

The PDL data generation unit 13*b* makes the above determination in accordance with the uniformity of the gradation values, which are indicative of the amount of recording with the S ink, for every pixel in the image data IM2. For example, when the gradation values for the S ink are the same (a state where the S ink is to be applied all over at a uniform concentration) in all the pixels constituting the image data IM2, then the content of the image data IM2 can be represented by very little information when represented in a command format, and converting the image data IM2 of the raster format into a command has a considerable effect in reducing the amount of information. In turn, in a case where the gradation values of the S ink for every pixel constituting the image data IM2 is not uniform but instead features considerable change for every pixel, then conversion into a command necessitates listing drawing commands for the S ink with respect to equivalent regions for each of the pixels. For this reason, converting the image data IM2 of a raster format into a command either has very little effect in reducing the amount of information, or may even conversely increase the amount of information. The PDL data generation unit 13*b* therefore is provided in advance with a threshold value TH1 for the number of types of gradation value for the S ink, and makes an affirmative determination in a case where the gradation values for the S ink for every pixel constituting the image data IM2 fall within a number of types not greater than the threshold value TH1 (a case of high uniformity).

Criterion 2:

The PDL data generation unit 13*b* makes the above determination in accordance with the shape that is represented by the S ink in the image data IM2. For example, when the range where the S ink is printed is a rectangle, as illustrated in FIG. 3, or is another simple shape such as a triangle, a circle, an ellipse, or the like, then less information is needed in representing the content of the image data IM2 with the command format. In a case where the range where the S ink is printed is a complex shape such as would involve multiple curves or polygonal lines, however, then more information is involved in the equations for the curves or coordinates for identifying the range where the S ink is printed, and converting the image data IM2 of a raster format into a command either has very little effect in reducing the amount of information, or may even conversely increase the amount of information. The PDL data generation unit 13*b* therefore, for example, uses pattern recognition or the like to determine whether or not the shape represented by the S ink in the image data IM2 applies as any shape that is previously established to be a type of simple shape, and makes an affirmative determination in a case where the shape applies (a case of high simplicity of the shape).

Criterion 3:

The PDL data generation unit 13*b* makes the above determination in accordance with the size of the range where the S ink is recorded in the image data IM2. For example, when the range where the S ink is printed is a small range to begin with, then there is not very much information even in the state where the image data IM2 is in the raster format, and therefore carrying out the conversion to a command has little effect in reducing the amount of information. The PDL data generation unit 13*b* therefore makes an affirmative determination when, for example, the number of pixels constituting the image data IM2 is equal to or greater than a threshold value TH2 that is previously established in relation to the number of pixels.

Criterion 4:

The PDL data generation unit 13*b* makes the above determination in accordance with the number of ranges where the S ink is recorded in the image data IM2. For example, it is assumed that in some instances the regions (S ink regions) in which are gathered pixels where an amount of recording with the S ink is present (where the amount of recording with the S ink is not zero) in the image data IM2 will be scattered about, surrounded by a region in which are gathered pixels where the amount of recording with the S ink is zero. In such a case, when there are many S ink regions, then the conversion to a command necessitates identifying one by one the coordinates, ranges, and the like of each of the S ink regions, and the amount of information is considerable (carrying out the conversion to a command has little effect in reducing the amount of information). The PDL data generation unit 13*b* therefore makes an affirmative determination when, for example, the number of S ink regions in the image data IM2 is not greater than a threshold value TH3 that is previously established in relation to the number of the S ink regions.

The PDL data generation unit 13*b* may employ any of the criteria described above. For example, the PDL data generation unit 13*b* determines that the image data IM2 is to be converted into a command in a case where an affirmative determination is made with all of the criteria described above. Alternatively, the PDL data generation unit 13*b* may determine that the image data IM2 is to be converted into a command in a case where an affirmative determination is made with any one of the criteria described above. Alternatively, the PDL data generation unit 13*b* may determine that the image data IM2 is to be converted into a command in a case where an affirmative determination is made in any plurality of criteria, though not all, of the criteria described above. Alternatively, the PDL data generation unit 13*b* may determine that the image data IM2 is to be converted into a command in a case where an affirmative determination is made with a specific criterion of the criteria described above. For example, making an affirmative determination in the criterion 1 would be a requisite condition for the conversion into a command.

Alternatively, the PDL data generation unit 13b may, in response to a determination result that is based on one criterion, change the manner in which the other criteria are used. For example, in a case where an affirmative determination has been made in the criterion 1, then an affirmative determination is made in the criterion 3 when the number of pixels constituting the image data IM2 is equal to or greater than the threshold value TH2, and thus the determination to carry out the conversion into a command results. However, in a case where an affirmative determination has not been made in the criterion 1 (a case of low uniformity), then an affirmative determination is made in the criterion 3 when the number of pixels constituting the image data IM2 is less than the threshold value TH2, and thus the determination to carry out the conversion into a command results. In other words, even in a case where there is low uniformity in the gradation values for the S ink for every pixel of the image data IM2, the computation burden for the conversion to a command and the amount of information after the conversion to a command are still small when there are few pixels that constitute the image data IM2, and therefore the determination to carry out the conversion into a command may be made.

In step S130, the PDL data generation unit 13b generates a command for designating the method of printing for the S ink that is represented by the image data IM2. For example, in a case where the image data IM2 is for printing the S ink as a base for other ink on the entire surface of A4-size paper at a recording amount of 100% (a maximum gradation value), then this image data IM2 is converted to a command such as:

Print Under InkS, sizeA4, duty100, or the like. This manner of conversion to a command makes it possible to dramatically reduce the amount of information, and also causes no degradation of the image to occur whatsoever in comparison to before the conversion to a command when the image is later developed on the basis of this command. Below, the command generated in step S130 shall also be called an S ink print command, as appropriate. The S ink print command is a command following a second PDL format (the vector format), which can be interpreted by the printer (the second apparatus 50), this format being different from both the raster format and a first page description language (PDL) format (also a vector format) constituting the PDL data, described below. The S ink print command following the second PDL format simplifies the command using a language that is used on by the printer (the second apparatus 50) in comparison to the first PDL format constituting the PDL data described below.

In step S140, however, the PDL data generation unit 13b compresses the image data IM2 without having executed the conversion into a command on the image data IM2. The format of compression performed herein is not particularly limited. For example, the PDL data generation unit 13b compresses the image data IM2 with any of a variety of formats, such as GIF, JPEG, PNG, or the like, to reduce the amount of information. In a case where an irreversible compression is performed, then a certain extent of degradation of the image quality when decompressed later is acceptable, while priority is given to efficacy in reducing the amount of information. In step S150, the PDL data generation unit 13b compresses any image data of the raster format other than the S ink, herein referring to the image data IM1, with any of a variety of formats such as are described above.

In step S160, the PDL data generation unit 13b generates PDL data in which an instruction for causing the printer (the second apparatus 50) to print the designated image is described by the first PDL format, which the printer is able to interpret. The PDL data is data in which the content and positions of each of the objects arranged in the page overall are described in a vector format, where, in the present embodiment, the PDL data includes the S ink print command and any compressed image data IM1 and IM2 created in steps S140 and S150. In other words, in a case where the flow passes through steps S130 and S150 (a case of "YES" in step S110 and step S120), then the PDL data generation unit 13b generates PDL data that includes the S ink print command and the compressed image data IM1. In a case where the flow passes through steps S140 and S150 (a case of "YES" in step S110 and "NO" in step S120), then the PDL data generation unit 13b generates PDL data that includes the compressed image data IM1, IM2. Further, in a case where the flow bypasses steps S130 and S140 and passes through step S150 (a case of "NO" in step S110), then the PDL data generation unit 13b generates PDL data that includes the compressed image data IM1.

For the PDL data to "include" the S ink print command or compressed image data IM1, IM2 could also mean that the command and data are inserted into, affixed to, or embedded in the PDL data. "Embedded" here could also mean both a case where the substance of the data is embedded in the PDL data as well as a case where the substance is not present in the PDL data, but rather link information indicative of the position where the substance is found (link information enabling access to the substance) is embedded in the PDL data. In step S170, the transfer unit 13c transfers the PDL data generated in step S160 to the second apparatus 50 (the print unit) via the transfer path 70. The PDL data also includes information involving the print conditions that have been selected by the user.

Figure 4:
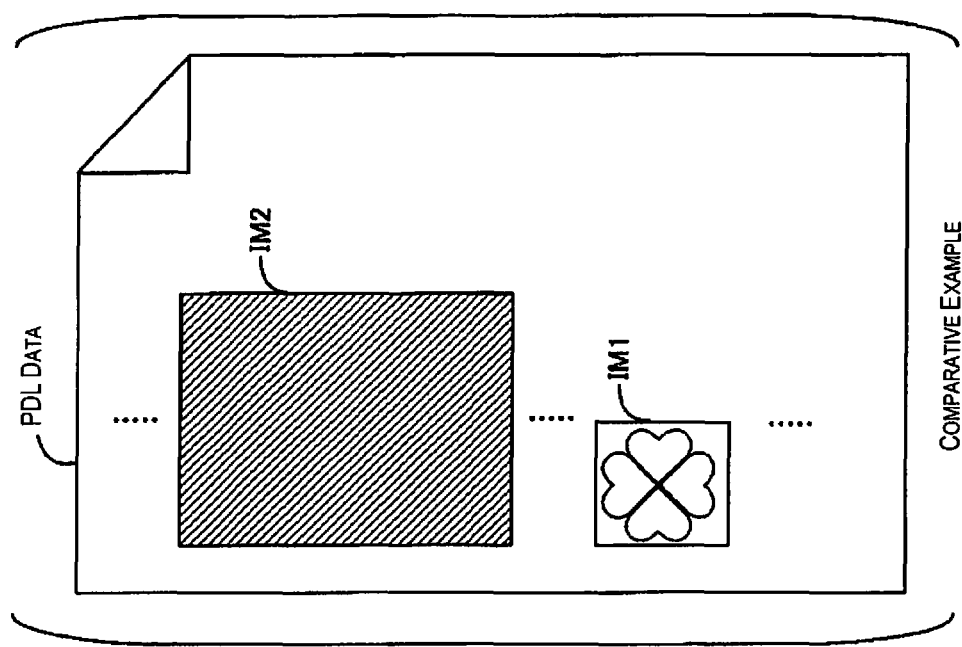
FIG. 4 is a drawing schematically illustrating one example of PDL data.
Figure 4:
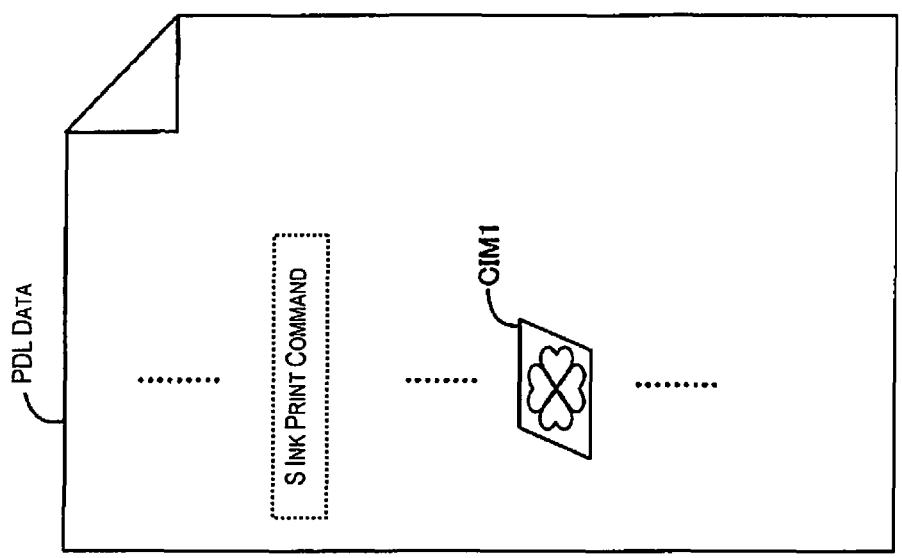

FIG. 4 schematically illustrates an example of PDL data generated in step S160 after steps S130 and S150. As illustrated in FIG. 4, the PDL data includes the S ink print command and the compressed image data IM1 (in FIG. 4, this is image data CIM1). It shall be readily understood that the PDL data also includes parameters for drawing the graphic image 3. The right side of FIG. 4 also parenthetically illustrates, as a comparative example, a state where the image data IM1 and the image data IM2 have been embedded in the PDL data without having been compressed or converted to a command. The image data including the S ink print command and the image data CIM1 involves a considerably reduced amount of information overall in comparison to the PDL data involved in the comparative example.

Figure 5:
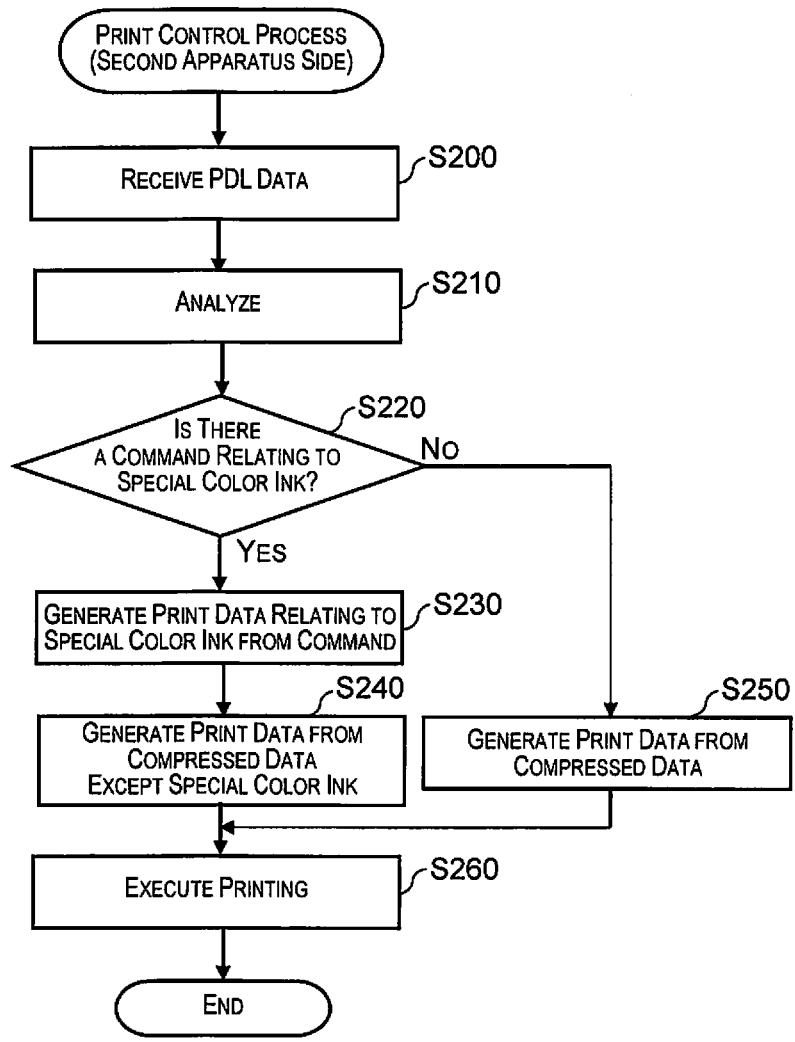
FIG. 5 is a flow chart illustrating a process that is executed on a second apparatus side.

FIG. 5 is a flow chart that illustrates a print control process as in the present embodiment, the process being executed on the second apparatus 50 side. The flow chart is described herein as being executed by the CPU 51 using the firmware FW. In step S200, the firmware FW receives the PDL data that has been transferred from the first apparatus 10 side via the transfer path 70. The firmware analyzes the received PDL data (step S210) and determines whether or not the PDL data includes a command (the S ink print command) pertaining to the S ink (step S220). The firmware FW proceeds to step S230 in a case where the PDL data does include the command pertaining to the S ink, and proceeds to step S250 in a case where the PDL does not include the command pertaining to the S ink.

In step S230, the firmware FW interprets the command and generates print data pertaining to the S ink. In such a case, the firmware FW reconstructs the image data IM2 in accordance with the command. The firmware FW matches the number of pixels by converting the number of pixels (converting the resolution) as needed in a case where the number of pixels of the reconstructed image data IM2 does not match the number of pixels needed in order to reproduce the designated image, which number is determined on the basis of the paper size and print resolution (dots/inch) selected at that time. The image data IM2 also undergoes a so-called halftone process in a case where each of the pixels of the image data IM2 represents the amount of recording with the S ink in multiple gradations (for example, 256 gradations 0 to 255). This allows the firmware FW to obtain binary-state image data IM2 (print data) in which each of the pixels defines the formation (dot-on) or non-formation (dot-off) of a dot of the S ink.

Next, in step S240, the firmware FW decompresses the compressed image data IM1 that is included in the PDL data by a method of decompressing that corresponds to the compression format. Print data is also generated from the decompressed image data IM1. In such a case, the firmware FW executes a process for color conversion of the image data IM1 as needed. In other words, the color system of the image data IM1 is converted to an ink color system that the second apparatus 50 uses for printing. For example, in a case where the image data IM1 represents the color information of each of the pixels by RGB, as described above, then ink amount data is obtained by converting the RGB to respective gradation values for CMYK at every pixel. The color conversion process can be executed by consulting an arbitrary color conversion look-up table. CMYK are each represented by, for example, 256 gradations. Executing the resolution conversion process and halftone process on the color-converted image data IM1 (the ink amount data) also allows the firmware FW to obtain image data IM1 (print data) in which each of the pixels defines the dot-on/dot-off for the CMYK inks. The timing at which the resolution conversion process is executed on the image data IM1 may be before or after the color conversion process.

In step S250, however, the firmware FW decompresses the compressed image data IM1, IM2 (when no compressed image data IM2 exists, then refers to the compressed image data IM1) included in the PDL by a method of decompressing that corresponds to the compression format, and generates the print data from the decompressed data. In a case where the PDL data also includes data in a vector format (for example, the parameters for drawing the graphic image 3) then in step S240 or step S250, this data in a vector format is interpreted and decompressed into image data of a raster format, and the decompressed image data is included with the decompressed image data IM1 as subject to the color conversion process, the resolution conversion process, and the halftone process.

In step S260, the firmware FW runs a process for sorting the print data generated by the processes in steps S230, 240 or the print data generated by the process in step S250, in the order in which the print data should be transferred to the print head 62. This sorting process decides the timing at which each of the dots of each of the inks defined by the print data will be ejected by any of the nozzles, in accordance with the pixel position thereof and the type of ink. The sorting-processed print data is sequentially transmitted to the AISC 56 by the firmware FW, which thereby causes the dots to be ejected from each of the nozzles. This causes a designated image (see FIG. 3) that is based on the print data to be reproduced on the print medium.

In this manner, in the present embodiment, the print control apparatus acquires the image data IM2 in the raster format, with which the amount of recording with the S ink is defined, as one part of a designated image when causing the print unit to print the designated image (step S100). Then, in accordance with the content of the image data IM2, a determination is made as to whether or not the conversion into a command should be carried out under the variety of criteria described above (step S120). Then, only in a case where it is determined that the conversion into a command should be carried out (determined that the conversion into a command will reduce the amount of information in the image data IM2), the image data IM2 is converted to the S ink print command (step S130), and the PDL is caused to include not only the compressed second image data (step S140) but also to include this converted command (step S160). Then, the PDL data including the command is understood to be transferred to the apparatus that has the print unit (the second apparatus 50) (step S170). As such, accurately reducing the amount of transfer of information that is necessary in order to cause the second apparatus 50 to print a designated image that includes the S ink shortens the length of time needed for this transfer, and, as a result, makes it possible to contribute to improving the speed of printing by the second apparatus 50. Also, the image quality pertaining to the S ink is not deteriorated at all according to this command conversion. Further, according to the present embodiment, it is possible to reliably eliminate the suffered defect of a contrary drop in the speed of printing caused by converting into a command the information for causing the second apparatus 50 to print a designated image that includes the S ink.

In the present embodiment, as described above, the S ink print command is described by the second PDL format, which is a language more depended on by the printer (the second apparatus 50) than the first PDL format constituting the PDL data. In other words, with the PDL data it is necessary to employ a general-purpose language (the first PDL format), because of the need to entrust the printer with the image processing, but in some instances describing the entire body of the PDL data with the first PDL format contrarily increases the amount of data overall or increases the print-side load. In the present embodiment, while the PDL data fundamentally uses a generic vector format (the first PDL format), portions that suffer an increase in the amount of data when the first PDL format is used or when a state of image data in the raster format (include compressed states) is effectuated are customized to a language depended on by the printer (the second PDL format), thereby accurately reducing the amount of data.

The foregoing principally describes, by way of example, a case where the S ink is a metallic ink, but a similar process to what is described by FIGS. 2 and 5 would also be performed in a case where a white ink, a clear ink, or a pre-coat solution is used as the S ink. In a case where a plurality of types of liquids are used as the S ink, then a determination as to whether or not to convert into a command would be carried out for every type of S ink. Also, though the foregoing describes the image data IM I as being compressed in step S150 (FIG. 2), the compression of the image data IM1 is not an essential process. In other words, the PDL data generation unit 13b may generate PDL data that includes the unaltered image data IM I still in an uncompressed state.

Additionally, in a case where the designated image includes image data in the raster format defining the amount of recording with the inks (CMYK) involved in process colors, then regarding such image data as well, the PDL data generation unit 13b could also conditionally cause the PDL data to include a form of the image data IM2 of the S ink that has been converted into a command. More specifically, with image data in which the amount of recording with only one color of ink among the inks of the process colors is uniformly (a state where there is no change or substantially no change in concentration) defined at each of the pixels, or with image data in which there is color-mixing of the plurality of inks of the process colors and there is no change in concentration between pixels, this image data would be converted into a command rather than being compressed as with the image data IM1. According to this configuration, the amount of information included in the PDL can be further reduced. Also, on the second apparatus 50 side, the image data can be readily reconstructed on the basis of such a command. In the present embodiment, ink with which the image data could be subject to the conversion into a command as described above may be understood to be included in the concept of special color ink.

The print control processes illustrated in FIGS. 2 and 5 may also be carried out within the printer (the second apparatus 50). For example, the CPU 51 would fulfill the variety of functions, described above, of the image data acquisition unit 13a, the PDL data generation unit 13b, and the transfer unit 13c, and another control unit within the printer would execute the process in FIG. 5 on the basis of PDL data that has been transferred to that control unit by the transfer unit 13c. In such a case, the CPU 51 accepts an operation for a print instruction or the print conditions regarding the designated image from the user via the operation panel 59, an external mobile terminal able to communicate with the second apparatus 50, or the like. Alternatively, the fulfillment of the flow chart in FIG. 2 may be divided between the printer driver 13 and the firmware FW.

What is claimed is:

1. A print control apparatus comprising:
an image data acquisition unit configured to acquire at least first image data of a raster format that defines color information and second image data of a raster format that defines an amount of recording with a special color ink different from the color that is indicated by the color information;
a PDL data generation unit configured to generate PDL data indicative of an instruction for printing a document comprising at least an image represented by the first image data and the second image data; and
a transfer unit configured to transfer the generated PDL data to a print unit,
the PDL data generation unit being configured to generate the PDL data by
compressing the first image data by a predetermined method of compression,
making a determination as to whether the second image data is converted into one of a first PDL format and a second PDL format, which is different from the first PDL format, in accordance with the content of the second image data, the second PDL format corresponding to a command for designating a method of printing for the special color ink represented by the second image data,
converting the second image data into the one of the first PDL format and the second PDL format according to the determination, and
generating the PDL data including the first image data compressed by the predetermined method of compression and the second image data converted into the one of the first PDL format and the second PDL format, wherein
the PDL data determination unit makes the determination in accordance with the number of ranges where the special color ink is recorded in the second image data such that the second image data is converted into the second PDL format when the number of ranges is not greater than a threshold value.

2. The print control apparatus as set forth in claim 1, wherein
the PDL data generation unit further makes the determination in accordance with the uniformity of the amounts of recording with the special color ink for each of the pixels of the second image data.

3. The print control apparatus as set forth in claim 1, wherein
the PDL data generation unit further makes the determination in accordance with the shape of a range that is represented by the special color ink in the second image data.

4. The print control apparatus as set forth in claim 1, wherein
the PDL data generation unit further makes the determination in accordance with the size of a range where the special color ink is recorded in the second image data.

5. The print control apparatus as set forth in claim 1, wherein
the PDL data generation unit generates the PDL data, which comprises the second image data, which has been compressed by a predetermined method of compression, in a case where a determination is made not to convert the second image data into a command.

6. The print control apparatus as set forth in claim 1, wherein p1 the special color ink applies as a white ink, a clear ink, a metallic ink, and/or a pre-coat solution.

7. The print control apparatus as set forth in claim 1, wherein
the amount of recording with the special color ink is a gradation value of a special color.

8. The print control apparatus as set forth in claim 1, wherein
an amount of data corresponding to the second image data described in the second PDL format is smaller than an amount of data corresponding to the second image data described in the first PDL format.

9. A print control apparatus comprising:
an image data acquisition unit configured to acquire at least first image data of a raster format that defines color information and second image data of a raster format that defines an amount of recording with a special color ink different from the color that is indicated by the color information;
a PDL data generation unit configured to generate PDL data with which an instruction for printing a document comprising at least an image represented by the first image data and the second image data is described by a page description language; and
a transfer unit configured to transfer the generated PDL data to a print unit, wherein
the PDL data generation unit determines whether or not to convert the second image data into a command in accordance with the content of the second image data and, in a case where a determination is made to convert into a command, generating a command for designating a method of printing for the special color ink represented by the second image data and generating PDL data that includes the generated command, and
the PDL data generation unit generates the PDL data, which comprises the first image data, which has been compressed by a predetermined method of compression, wherein
the PDL data determination unit makes the determination in accordance with the number of ranges where the special color ink is recorded in the second image data such that the second image data is converted into the second PDL format when the number of ranges is not greater than a threshold value.

10. A non-transitory recording medium, having a print control program, for causing a computer to execute process comprising the step of:
acquiring at least first image data of a raster format that defines color information and second image data of a raster format that defines an amount of recording with a special color ink different from the color that is indicated by the color information;

generating PDL data indicative of an instruction for printing a document including at least an image represented by the first image data and the second image data; and transferring the generated PDL data to a print unit, the generating of the PDL data including generating the PDL data by compressing the first image data by a predetermined method of compression, making a determination as to whether the second image data is converted into one of a first PDL format and a second PDL format, which is different from the first PDL format, in accordance with the content of the second image data, the second PDL format corresponding to a command for designating a method of printing for the special color ink represented by the second image data, converting the second image data into the one of the first PDL format and the second PDL format according to the determination, and generating the PDL data including the first image data compressed by the predetermined method of compression and the second image data converted into the one of the first PDL format and the second PDL format, wherein the making of the determinnation includes making the determination in accordance with the number of ranges where the special color ink is recorded in the second image data such that the second image data is converted into the second PDL format when the number of ranges is not greater than a threshold value.

\* \* \* \* \*